United States Patent
Sakura et al.

(10) Patent No.: US 7,691,020 B2
(45) Date of Patent: Apr. 6, 2010

(54) CHAIN TRANSMISSION DEVICE

(75) Inventors: Shunji Sakura, Osaka (JP); Akira Hirai, Osaka (JP); Masatoshi Sonoda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 179 days.

(21) Appl. No.: 11/821,614

(22) Filed: Jun. 25, 2007

(65) Prior Publication Data

US 2008/0009377 A1     Jan. 10, 2008

(30) Foreign Application Priority Data

Jul. 10, 2006    (JP)    ............... 2006-189491

(51) Int. Cl.
*F16H 7/06*    (2006.01)
*F16H 55/30*    (2006.01)

(52) U.S. Cl. .............. 474/156; 474/152; 474/160; 474/212; 474/213

(58) Field of Classification Search .................. 474/156, 474/141, 160, 212, 213
See application file for complete search history.

(56) References Cited

U.S. PATENT DOCUMENTS

| | | | | |
|---|---|---|---|---|
| 5,176,587 A | * | 1/1993 | Mott | ........................... 474/216 |
| 6,155,943 A | * | 12/2000 | Ledvina et al. | ............. 474/156 |
| 7,125,356 B2 | * | 10/2006 | Todd | ........................... 474/152 |
| 2001/0045773 A1 | | 11/2001 | Rutz et al. | |
| 2004/0097314 A1 | | 5/2004 | Kotera | |
| 2005/0119079 A1 | | 6/2005 | Okabe | |
| 2006/0240925 A1 | | 10/2006 | Todd | |

FOREIGN PATENT DOCUMENTS

| | | |
|---|---|---|
| JP | 64-030960 | 2/1989 |
| JP | 02-53559 | 4/1990 |
| JP | 03-107654 | 8/1991 |
| JP | 08-042385 | 10/1997 |
| JP | 2005-163806 | 6/2005 |

OTHER PUBLICATIONS

U.S. Appl. No. 11/517,214, T. Ogawa et al.

* cited by examiner

*Primary Examiner*—Robert A Siconolfi
*Assistant Examiner*—San Aung
(74) *Attorney, Agent, or Firm*—Howson & Howson LLP

(57) ABSTRACT

In a roller or bushing chain transmission a standard roller or bushing chain having a uniform chain pitch meshes with a sprocket having at least two different tooth form pitches.

2 Claims, 5 Drawing Sheets

CHAIN TRANSMISSION DEVICE

FIELD OF THE INVENTION

This invention relates to a chain transmission, and more particularly to a chain transmission comprising a roller chain or bushing chain, in which noises, generated when a roller a bushing engages a sprocket tooth, are suppressed.

BACKGROUND OF THE INVENTION

In a typical chain transmission in which a roller chain or a bushing chain engages a sprocket, the sprocket is defined by an industrial standard, such as the Japanese Industrial Standard (JIS). The Japanese Industrial Standard JIS B1801-1997 and its attached "paper 2" also define sprocket tooth forms, including S-tooth forms, U-tooth forms, and ISO-tooth forms).

The standard describes the following expression.

$$pa=p(1+(ds-d1)/d)$$

in which, pa is the tooth form pitch;
p is the chain pitch;
ds is two times the radius of the arc of the tooth gap bottom;
d1 is the outer diameter of a roller; and
d IS the diameter of the pitch circle.

In this specification, the terms "standard roller chain" and "standard bushing chain" refer to roller chains and bushing chains as defined in JIS B1801-1997, and the term "standard sprocket" refers to a sprocket having S-tooth form or a U-tooth form, as defined in its attached paper 2.

A standard roller chain comprises inner links each composed of a pair of opposed inner link plates connected by two bushings, the ends of the bushings being press-fit into bushing holes in the link plates, and a roller rotatable on each bushing. The chain also comprises outer links, each composed of a pair of opposed outer link plates connected by a pair of pins press-fit into pin holes in the outer link plates. The links are interconnected by having a pin of each outer link extend through a bushing of an inner link. In this way, the chain is formed of alternating inner and outer links, with the links connected to one another flexibly so that the chain can bend around a sprocket. The standard roller chain has a uniform chain pitch p, which corresponds to the distance between the centers of adjacent rollers.

The standard sprocket is shown in FIG. 4. In the standard sprocket, tooth surfaces, which are continuous with an arcuate tooth gap bottom, are symmetrical with respect to center lines x which extend radially from a center of rotation O through the centers of the tooth gap bottoms. The center lines x intersect the pitch circle pc at intersection points a, and the angle between adjacent lines x is the tooth pitch angle θ. The tooth pitch angle θ is related to the number z of teeth on the sprocket, by θ=360°/z.

The tooth form pitch pa is a distance between adjacent intersections a. That is, the tooth form pitch pa is the length of a chord corresponding to the tooth pitch angle θ. Since the standard sprocket has uniform tooth pitch angles θ, the tooth form pitch distances pa along the circumference of the pitch circle pc are equal. Furthermore, the tooth form pitch pa has a fixed relation to the chain pitch p as expressed by the formula $$pa=p\,(1+(ds-d1)\,/d).$$

U.S. Patent Publication 2005/0119079 describes a roller chain transmission, which reduces noise generated when a roller of a roller chain engages with a sprocket. The roller chain transmission comprising a roller chain, and a sprocket which has at least first teeth and second teeth having different tooth forms. The first teeth and second teeth are randomly distributed on the periphery of the sprocket, the number of second teeth does not exceed four times the number of first teeth, and the teeth immediately preceding and following each of the first teeth on the periphery of the sprocket are second teeth.

In FIG. 4, the rollers of a standard roller chain 1 are shown engaging a standard sprocket 3 in a conventional chain transmission. The standard roller chain 1 has a uniform chain pitch p (the distance between the centers O1 of the rollers 2). The standard sprocket 3 is a driving sprocket having eighteen teeth. Since the tooth pitch angle θ is determined by the expression θ=360°/z, the tooth pitch angle θ of the driving sprocket is 20°. Furthermore, as described above, the tooth form pitch pa is the length of a chord corresponding to the tooth pitch angle θ. Therefore, the standard sprocket 3 has uniform tooth pitch angles θ of 20° and a uniform tooth form pitch pa.

When the standard sprocket 3 is rotated clockwise, at the beginning of engagement of a roller 2, the roller is moved relative to the center O1 of a preceding roller that has already become seated on a tooth gap bottom, in an arc having a radius corresponding to the chain pitch p. The roller then collides with the center of a tooth gap bottom substantially at a right angle. The kinetic energy of the roller 2 is transmitted to the tooth gap bottom portion without being buffered. The collision of the roller with the tooth gap bottom results in significant vibration and noise.

Further, since the tooth form pitch pa has a fixed relationship with the chain pitch p according to the expression pa=p (1+(ds−dl)/d), each roller 2 abuts a tooth gap bottom of the standard sprocket 3 at the same position t, as shown by a circle marks in FIG. 4. As a result, the collisions occur at a particular frequency depending on the rotational speed of the sprocket and the noise and vibration have a corresponding frequency.

FIG. 5 is a graph showing a result of noise measurement on the conventional chain transmission of FIG. 4. The noise measurements were carried out with a transmission having a standard sprocket with eighteen teeth as a driving sprocket and a standard sprocket having thirty six teeth as a driven sprocket. The rotational speed of the driving sprocket was varied over a range from 500 to 5,000 rpm.

According to FIG. 5, overall sound designated "OA" represents the entire noise generated by the transmission. The OA level in FIG. 5 is close to the level of each rotational order sound. That is, the area S1 between the level of each rotational order sound and the level of the overall sound OA is small. Thus, in the conventional chain transmission, the rotational order sounds are conspicuous and grating to the ear.

The approach described in U.S. Patent Publication 2005/ 0119079 results in a noise reduction, but, because the sprocket has at least two different tooth forms, its manufacture is complex and its manufacturing cost is high.

Accordingly, an object of this invention is to provide a chain transmission in which vibration and noise generated when a roller of a roller chain or a bushing of a bushing chain engage a sprocket are reduced, and in which the manufacturing cost of the sprocket is reduced.

SUMMARY OF THE INVENTION

In the chain transmission according to the invention the transmission medium is a chain from the group consisting of roller chains comprising a set of rollers as sprocket-engaging elements, the rollers being disposed at a uniform pitch along the length of the chain, and bushing chains comprising a set of bushings as sprocket-engaging elements, the bushings being disposed at a uniform pitch along the length of the chain. At least one sprocket of the transmission is engaged in driving or driven relationship with the chain, and its teeth, disposed circumferentially around the sprocket, have tooth gaps for receiving sprocket-engaging elements of the chain. Adjacent tooth gaps of the sprocket are spaced by pitch distances, and the sprocket has at least two different pitch distances, arranged irregularly on a pitch circle about the circumference of the sprocket.

Since the chain has a uniform pitch and the sprocket has at least two different tooth form pitches arranged irregularly along the pitch circle, the kinetic energy of the roller or bushing is buffered on engagement of the roller or bushing with the sprocket. Consequently, engagement shock is relatively small, and engagement sounds are reduced. Furthermore, since the time intervals between collisions of the rollers or bushings with the sprocket are not uniform, vibration and noise determined by a number of sprocket teeth are reduced. The difference between the overall (OA) sound level and the level of each rotational order sound is increased so that noises grating to the ear are reduced. Finally, since the sprocket differs from a standard sprocket only in the tooth pitch angle, it can be manufactured easily by sintering, and at a low cost.

DETAILED DESCRIPTION OF THE PREFERRED EMBODIMENTS

Figure 1:
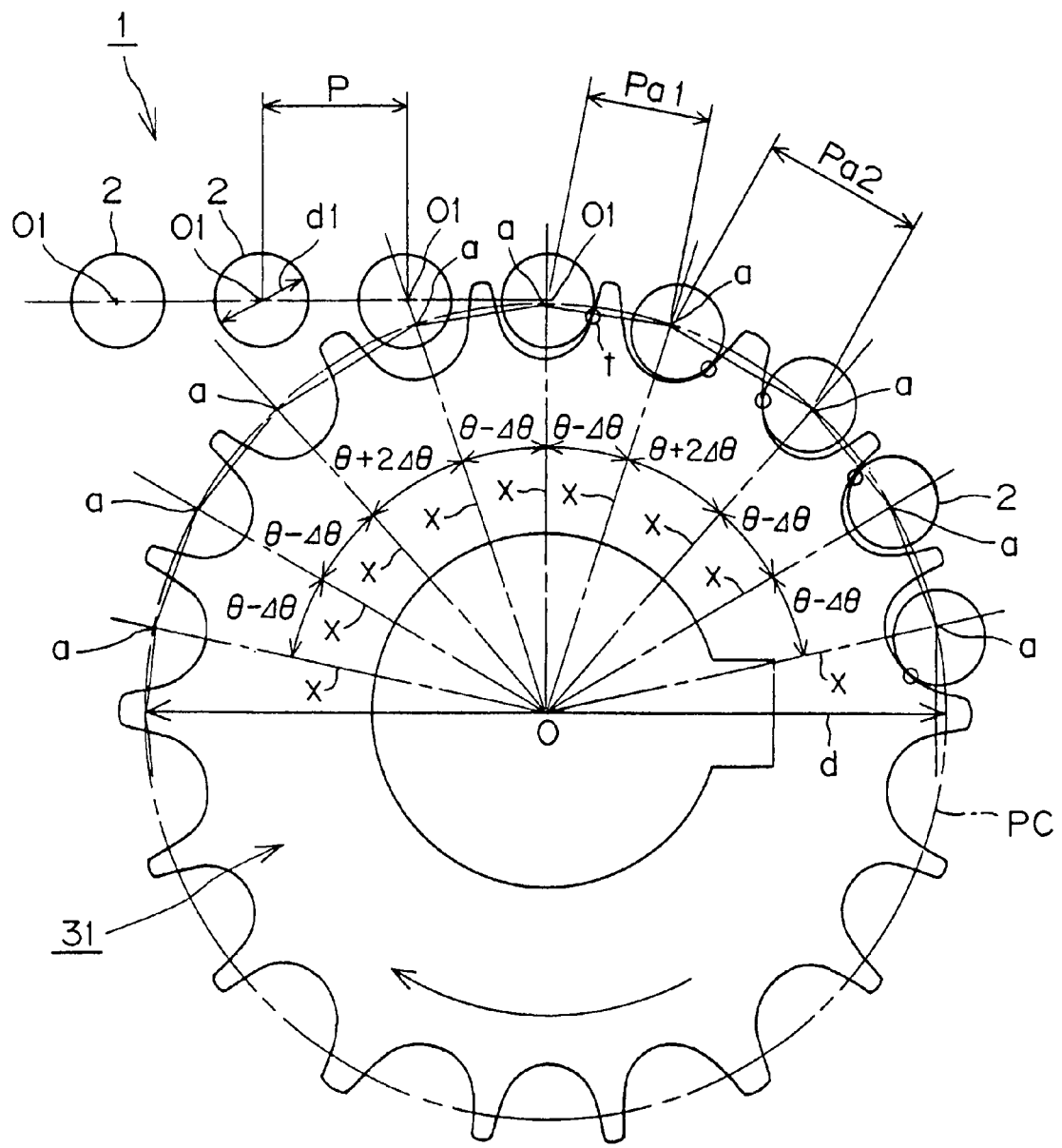
FIG. 1 is a schematic front elevational view showing the engagement of a standard roller chain with a sprocket in a chain transmission according to a first embodiment of the invention.

The best mode of the chain transmission according to the invention is a transmission, as shown in FIG. 1, in which the chain is a standard roller chain 1, having a uniform chain pitch p, and a sprocket 31, engaged by the chain, has two different tooth form pitches, pa1 and pa2, The standard roller chain 1 includes inner links, each composed of a pair of opposed inner link plates connected by two bushings, the ends of the bushings being press-fit into bushing holes in the link plates, and a roller rotatable on each bushing. The chain also comprises outer links, each composed of a pair of opposed outer link plates connected by a pair of pins press-fit into pin holes in the outer link plates. The links are interconnected by having a pin of each outer link extend through a bushing of an inner link. In this way, the chain is formed of alternating inner and outer links, with the links connected to one another flexibly so that the chain can bend around a sprocket. The standard roller chain has a uniform chain pitch p, which corresponds to the distance between the centers O1 of adjacent rollers. FIG. 1 shows only the rollers 2, and the bushings, inner plates, pins, outer plates, and outer links are not shown.

In the sprocket 31, the facing tooth surfaces are continuous with, and connected to each other by an arcuate tooth gap bottom. The facing tooth surfaces are symmetrical with respect to a radial center line x extending from the sprocket center of rotation O, and each arcuate tooth gap bottoms is likewise symmetrical with respect to a radial center line x.

Figure 4:
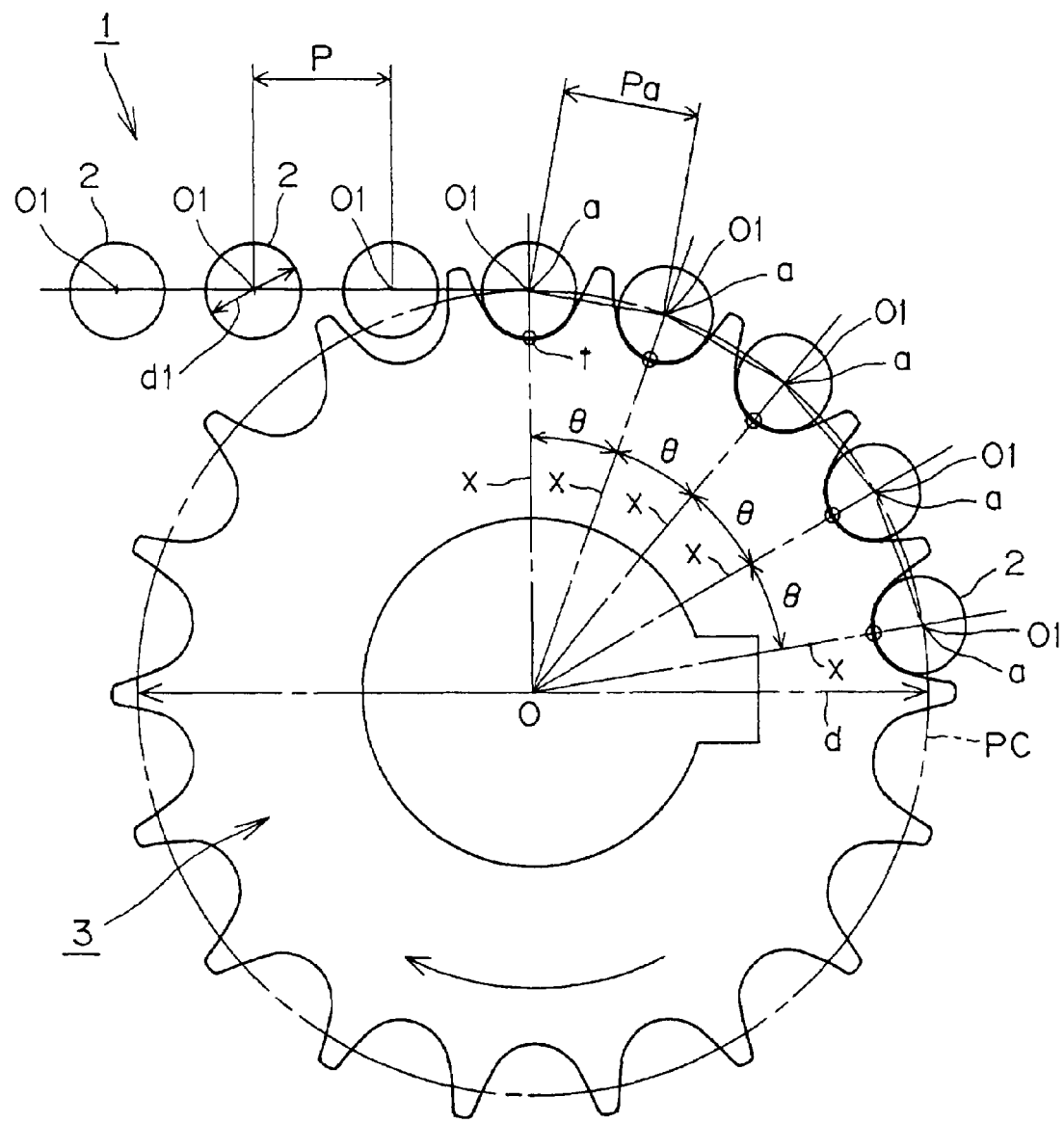
FIG. 4 is a schematic front elevational view showing the engagement of a standard roller chain with a conventional sprocket.

The sprocket 31 in FIG. 1 is a driving sprocket having eighteen teeth. While the above-mentioned standard sprocket 3, shown in FIG. 4, has tooth pitch angles θ of 20°, which all are equal, the sprocket 31 according to the invention has two different tooth pitch angles, which differ from the standard tooth pitch angle θ, determined by the expression θ=360°/z.

The two different tooth pitch angles can be described as the angles θ−Δθ, and θ+2Δθ. That is, a first tooth pitch angle, θ−Δθ, is smaller than the standard pitch angle θ by an amount Δθ. The second tooth pitch angle, θ+2Δθ, is larger than the standard pitch angle θ by two times the amount Δθ. Furthermore, Δθ must be not more than ¼ the standard pitch angle θ. That is, Δθ≦θ/4. In this way, the tooth pitch angle is within a range, allowing engagement of the roller 2 with the sprocket. Specifically, since the sprocket 31 has eighteen teeth. the standard pitch angle θ is 20° based on the expression θ=360°/z, and Δθ is not greater than 5°(Δθ≦5°), based on the expression Δθ≦θ/4. The total of the two kinds of tooth pitch angles, θ−Δθ and θ+2Δθ, in the sprocket is 2Π, that is, 360°.

In the sprocket 31, as shown in FIG. 1, these two kinds of tooth pitch angles, θ−Δθ and θ+2Δθ, are sequentially arranged, in a clockwise direction, so that sets of two tooth pitch angles θ−Δθ are separated by a single tooth pitch angle θ+2Δθ.

Further, the tooth form pitch pa1 is the length of a chord corresponding to the smaller tooth pitch angle θ−Δθ, and the tooth form pitch pa2 is the length of a chord corresponding to the larger tooth pitch angle θ+2Δθ. Therefore, the sprocket 31 has two kinds of different tooth form pitches pa1 and pa2 and these tooth form pitches pa1 and pa2 are sequentially arranged in a clockwise direction along the pitch circle pc in repeating sets, each consisting of two tooth form pitches pa1 and one tooth form pitch pa2.

As shown in FIG. 1, when the sprocket 31 is rotated clockwise, a roller 2 moves relatively about the center O1 of an already seated preceding roller 2 in an arc having a radius equal to the chain pitch p. The roller moves in this arc until it abuts a tooth gap bottom or a tooth surface of the sprocket 31 at an abutment position t, shown by a circle mark. The roller abuts a tooth surface, in a substantially tangential direction relative to the tooth surface. Thus the kinetic energy of the roller 2 is buffered, so that the shock due to the abutment is small. As a result, engagement noise is reduced.

From FIG. 1 it can also be seen that, since the standard roller chain 1 has a uniform chain pitch p, and the sprocket 31 has two different tooth form pitches, pa1 and pa2 arranged in sequential sets each consisting of two tooth form pitches pa1 and one tooth form pitch pa2, the abutment position t is different from one roller to the next. Thus the timing of the collisions of the rollers shifts continually, and vibration and noise, having an order determined by a number of teeth, are reduced.

Figure 2:
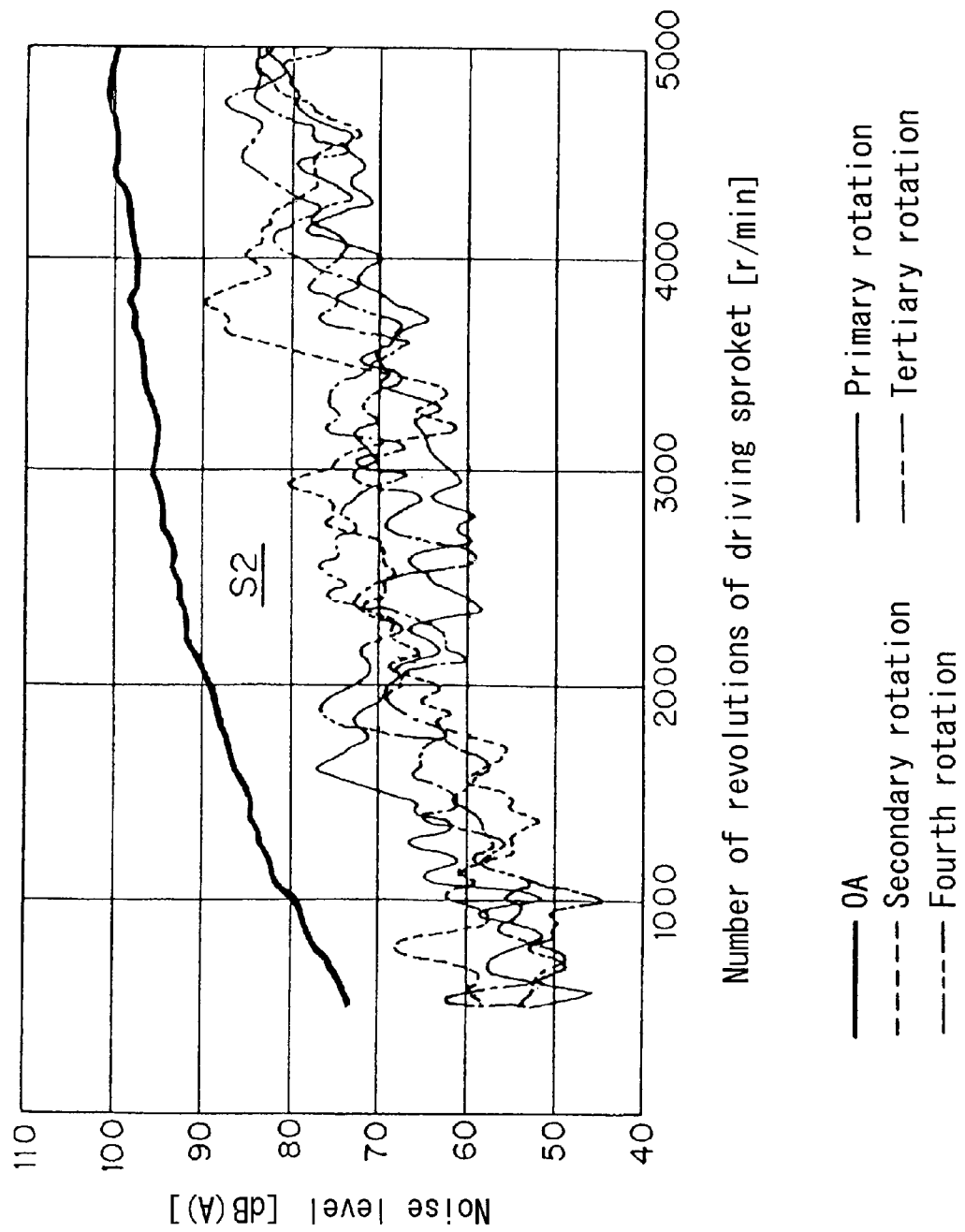
FIG. 2 is a graph showing the results of noise level tests on a chain transmission according to the first embodiment of the invention.
Figure 5:
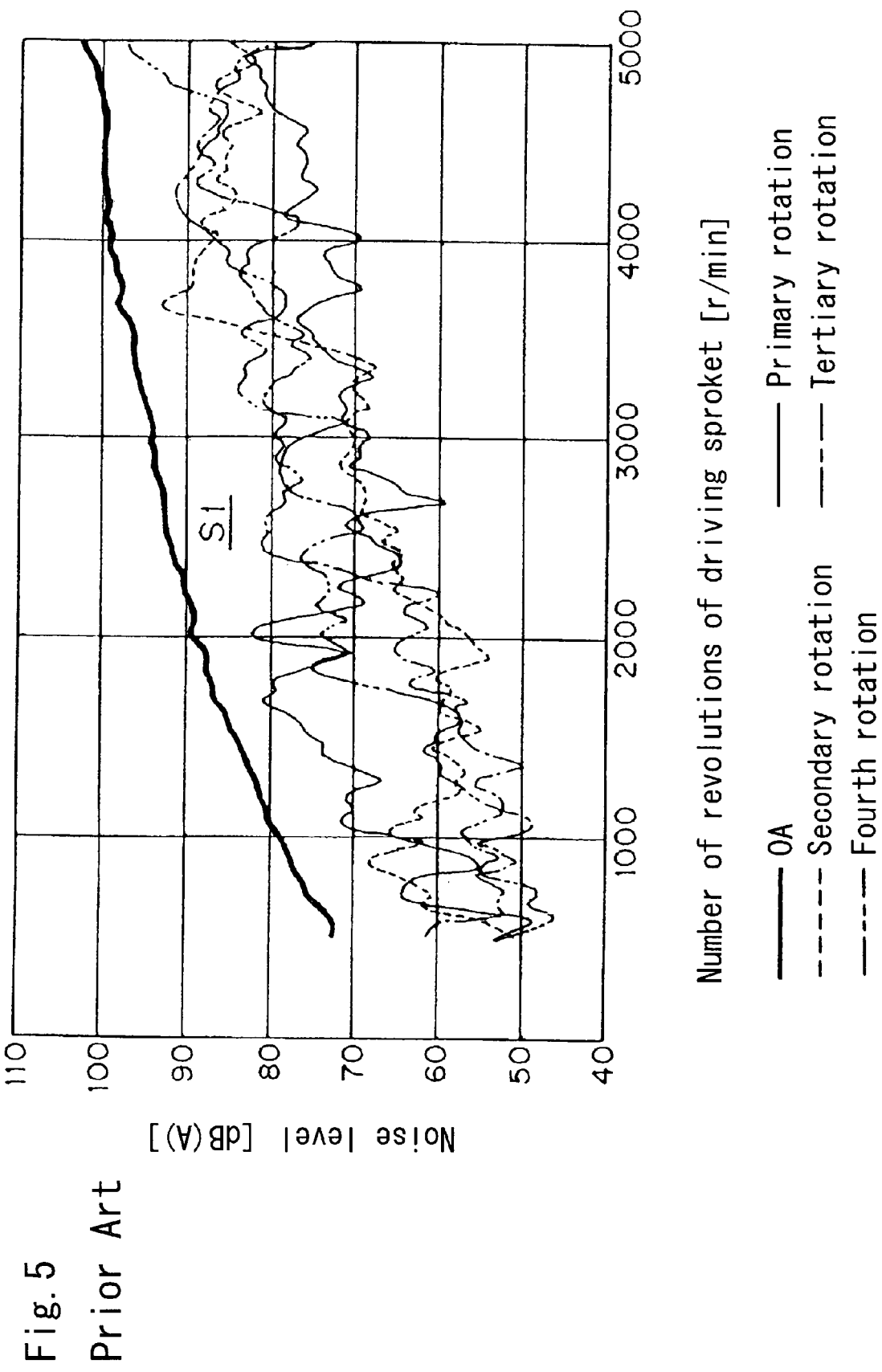
FIG. 5 is a graph showing a results of noise level tests on the conventional chain transmission shown in FIG. 4.

In the graph of FIG. 2, noise measurements are depicted for the transmission of FIG. for rotational speeds of the driving sprocket 31 ranging from 500 to 5,000 rpm. The overall (OA) sounds are farther away from the rotational order sounds. That is, the area S2 between the overall sound level and each order sound level is larger than the area S1 in the case of a conventional roller chain transmission as shown in FIG. 5. Thus, in the chain transmission according to the invention the problem of the conventional transmission, that each rotational order sound was grating to the ear, was alleviated.

Several effects were obtained with the transmission of the first embodiment of the invention. The sequential sets of tooth form pitches, each set consisting of two shorter tooth form pitches pa1 and one longer tooth form pitch pa2, the kinetic energy of the rollers was buffered on engagement of the rollers with the sprocket 31, and shock due to the abutment was small so that the magnitude of the engagement sounds was reduced. Furthermore, since the timing of collisions of successive rollers with the sprocket teeth is shifted from one roller to the next, the vibrations and noise, having an order determined by a number of teeth, are reduced. The difference between the magnitude of the overall (OA) sound and the magnitude of each rotational order sound is large, so that noises grating to ear are also reduced. Finally, since the sprocket 31 is only different from the standard sprocket 3 in a its tooth pitch angles, it can be easily and inexpensively manufactured by sintering.

Figure 3:
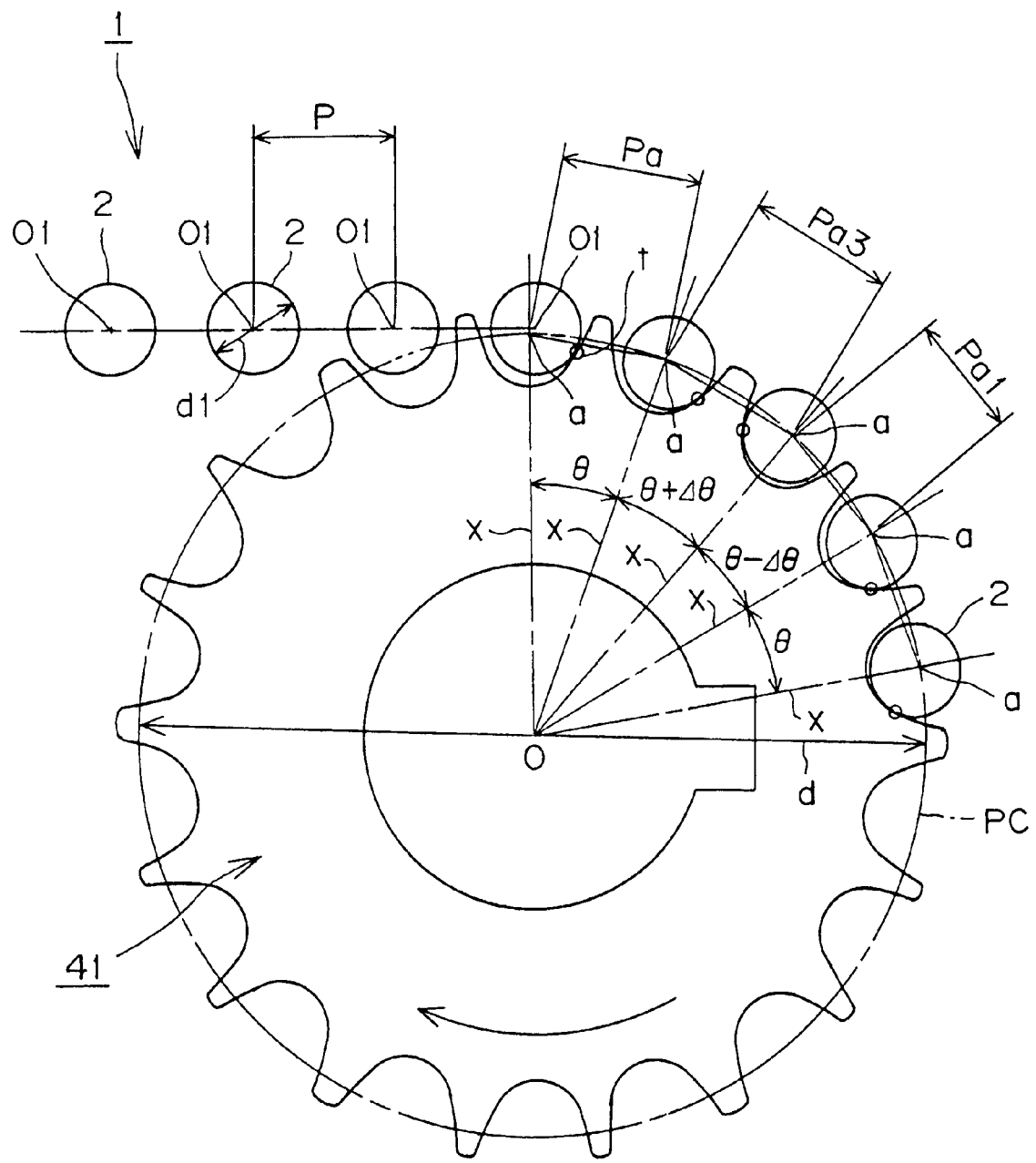
FIG. 3 is a schematic front elevational view showing the engagement of a standard roller chain with a sprocket in a chain transmission according to a second embodiment of the invention.

In the embodiment illustrated in FIG. 3, the roller chain 1 is the same standard roller chain as shown in FIG. 1. The sprocket 41, however, is different from the sprocket 31 of the first embodiment in that the sprocket 41 has three different tooth pitch angles: θ+Δθ, and θ−Δθ. The tooth pitch angle θ+Δθ is larger than the standard pitch angle θ by an amount Δθ. And the tooth pitch angle θ−Δθ is smaller than the standard pitch angle θ by an the same amount, Δθ. As in the first embodiment, to allow engagement of the rollers with the sprocket, Δθ must be not more than ¼ the standard pitch angle θ. That is, Δθ≦θ/4. Specifically, the sprocket 41 has eighteen teeth. Therefore, the standard pitch angle θ is 20°, based on the expression θ=360°/z, and Δθ≦5°, based on the expression θ≦θ/4. The total of the three kinds of tooth pitch angles. θ, θ+Δθ, and θ−Δθ is 2Π, or 360°.

In the sprocket 41, as shown in FIG. 3, the three tooth pitch angles 74, θ+Δθ, and θ−Δθ, are sequentially arranged clockwise in sets, each set consisting of one tooth pitch angle θ (the standard pitch angle), one tooth pitch angle θ+Δθ, and one tooth pitch angle θ−Δθ. The tooth form pitch pa is the length of a chord corresponding to the standard tooth pitch angle θ, the tooth form pitch pa3 is the length of a chord corresponding to the tooth pitch angle θ+Δθ, and the tooth form pitch pa1 is the length of a chord corresponding to the tooth pitch angle θ−Δθ. Therefore, the sprocket 41 has three different tooth form pitches, pa, pa3, and pa1, and these tooth form pitches are sequentially arranged in a clockwise direction along the circumference of the pitch circle pc.

As shown in FIG. 3, when the sprocket 41 is rotated clockwise, a roller 2 moves relatively about the center O1 of an already seated preceding roller 2 in an arc having a radius equal to the chain pitch p. The roller moves in this arc until it abuts a tooth gap bottom or a tooth surface of the sprocket 41 at an abutment position t, shown by a circle mark. The roller abuts a tooth surface, in a substantially tangential direction relative to the tooth surface. Thus the kinetic energy of the roller 2 is buffered, so that the shock due to the abutment is small. As a result, engagement noise is reduced.

From FIG. 3 it can also be seen that, since the standard roller chain 1 has a uniform chain pitch p, but the sprocket 41 has three different tooth form pitches, pa, pa3 and pa1, arranged in sequential sets, the abutment position t is different from one roller to the next. Thus the timing of the collisions of the rollers shifts continually, and vibration and noise, having an order determined by a number of teeth, are reduced.

The effects of the second embodiment of the invention are substantially the same as those of the first embodiment, as described above.

Although in the embodiments described, the tooth form pitches are arranged in sets, the sets being in a repeating sequence in both cases, it is not necessary that the sets be arranged in a repeating sequence. The tooth form pitches can be in any sequence as long as the sprocket has at least two different individual tooth form pitches so that the tooth form pitch is not uniform about the circumference of the sprocket.

Furthermore, it is not necessary that the number of tooth form pitches be limited to three as in the second embodiment. The sprocket can have more than three different as long as the sprocket tooth form pitch variations are within a range permitting engagement of a standard roller chain with the sprocket.

Although the sprocket described above is a driving sprocket, the advantages of the invention can be realized in a transmission in which a driven sprocket has the characteristics of the above-described driving sprockets. Finally, although the invention has been described as utilizing a standard roller chain the advantages of the invention can also be realized in a transmission utilizing a standard bushing chain.

We claim:

1. A chain transmission comprising:

a chain from the group consisting of roller chains comprising a set of rollers as sprocket-engaging elements, the rollers being disposed at a uniform pitch along the length of the chain, and bushing chains comprising a set of bushings as sprocket-engaging elements, the bushings being disposed at a uniform pitch along the length of the chain; and at least one sprocket having a center of rotation and sprocket teeth disposed circumferentially around the sprocket about the center of rotation, the sprocket teeth being engaged in driving or driven relationship with the chain;

the sprocket teeth having arcuate tooth gaps, arranged around the circumference of the sprocket, for receiving sprocket-engaging elements of the chain, each of the tooth gaps of the sprocket being symmetrical about one of a plurality of center lines extending radially from the center of rotation of the sprocket and having a tooth gap bottom intersected by one of said center lines, adjacent tooth gap bottoms of the sprocket being spaced by pitch distances measured between successive intersections of said center lines with a pitch circle, the sprocket having at least two different pitch distances, said tooth gaps being arranged in a sequence such that said pitch distances are disposed around the circumference of the sprocket in repeating sets, each set being composed of at least three pitch distances, the sum of the pitch distances of each set being the same as the sum of the pitch distances of every other set, and at least one pitch distance in each said set being different from at least one other pitch distance in the same set; and the radial distances from the tooth gap bottoms to the center of rotation of the sprocket being such that, when sprocket-engaging elements of the chain are seated on the sprocket in the tooth gaps of the sprocket, at least some of said seated sprocket-engaging elements engage the sprocket only at locations spaced from the bottoms of the tooth gaps in which they are seated.

2. A chain transmission according to claim 1, in which the radial distances from the center of rotation of the sprocket to the tooth gap bottoms of the sprocket are uniform.

* * * * *